United States Patent
Grinshpun et al.

[19]

[11] Patent Number: 5,955,013
[45] Date of Patent: Sep. 21, 1999

[54] MANUFACTURE OF FOAM-CONTAINING STRUCTURES

[75] Inventors: Vyacheslav S. Grinshpun, Midland, Mich.; Byron Hulls, Reynoldsburg; Kevin J. Spoo, Granville, both of Ohio

[73] Assignee: Owens Corning Fiberglas Technology, Inc., Summit, Ill.

[21] Appl. No.: 09/116,157

[22] Filed: Jul. 16, 1998

Related U.S. Application Data

[63] Continuation-in-part of application No. 08/677,692, Jul. 10, 1996, Pat. No. 5,807,514.

[51] Int. Cl.⁶ .............................. B29C 44/04; B29C 44/06
[52] U.S. Cl. ..................... 264/45.5; 264/46.4; 264/46.6; 264/52; 264/255; 264/257
[58] Field of Search .................................. 264/45.5, 46.4, 264/46.6, 52, 255, 257

[56] References Cited

U.S. PATENT DOCUMENTS

| | | |
|---|---|---|
| 3,533,901 | 10/1970 | Sulk . |
| 3,556,888 | 1/1971 | Goldsworthy . |
| 3,895,087 | 7/1975 | Ottinger et al. . |
| 3,895,896 | 7/1975 | White et al. . |
| 3,942,926 | 3/1976 | Bulloch, Jr. .............................. 264/46.4 |
| 3,968,561 | 7/1976 | Oakes et al. . |
| 4,028,450 | 6/1977 | Gould ...................................... 264/46.4 |
| 4,326,904 | 4/1982 | Eckert et al. .............................. 264/52 |
| 4,576,855 | 3/1986 | Okina et al. ............................. 428/215 |
| 4,645,710 | 2/1987 | Baitinger et al. . |
| 4,654,234 | 3/1987 | Rosin et al. .......................... 427/393.5 |
| 4,681,714 | 7/1987 | Lopes et al. ............................ 264/46.6 |
| 4,783,489 | 11/1988 | Inoue et al. ................................ 521/63 |
| 5,013,508 | 5/1991 | Troester . |
| 5,106,547 | 4/1992 | Beck et al. . |
| 5,116,557 | 5/1992 | Debaes et al. . |
| 5,142,835 | 9/1992 | Mrocca . |
| 5,173,227 | 12/1992 | Ewen et al. . |
| 5,286,320 | 2/1994 | McGrath et al. . |
| 5,608,957 | 3/1997 | Hanagan . |
| 5,807,514 | 9/1998 | Grinshpun et al. .................... 264/46.6 |

FOREIGN PATENT DOCUMENTS

| | | |
|---|---|---|
| 147766 | 12/1978 | Japan . |
| 125836 | 6/1986 | Japan . |

*Primary Examiner*—Allan R. Kuhns
*Attorney, Agent, or Firm*—Inger H. Eckert

[57] ABSTRACT

A method for producing a foam-containing structure. In a first embodiment, a defoamer is applied to the inner surface of an impermeable carrier. A foamed resin is introduced inside the carrier and contacts the defoamer to form a liquid resin layer on the inner surface. The foamed resin and liquid resin layer are cured to produce a foamed resin inner core and a solid resin outer layer. In a second embodiment, a permeable carrier is covered with an impermeable release material. A defoamer is applied to the carrier. A foamed resin is introduced inside the carrier and contacts the defoamer to form a liquid resin layer impregnating the carrier. The foamed resin and liquid resin layer are cured to produce a foamed resin inner core, the carrier as a facer material, and a solid resin layer impregnating the carrier. In a third embodiment, a defoamer and a catalyst are applied to a permeable carrier. A foamed resin is introduced inside the carrier and contacts the defoamer to form a liquid resin layer impregnating the carrier. At least a portion of the liquid resin layer contacts the catalyst and cures into a solid resin layer. The foamed resin and any uncured portion of the liquid resin layer are cured to produce a foamed resin inner core, the carrier as a facer material, and a solid resin layer impregnating the carrier.

20 Claims, 8 Drawing Sheets

MANUFACTURE OF FOAM-CONTAINING STRUCTURES

CROSS-REFERENCE TO RELATED APPLICATION

This application is a continuation-in-part of co-pending U.S. application Ser. No. 08/677,692, filed Jul. 10, 1996, now U.S. Pat. No. 5,807,514 by Grinshpun et al., entitled "Manufacture of Foam-Containing Composites".

TECHNICAL FIELD AND INDUSTRIAL APPLICABILITY OF THE INVENTION

This invention relates in general to a method for producing a foam-containing structure including a foamed resin core and a solid resin outer layer. More specifically, the invention relates to a method in which a defoamer is used to cause defoaming of a portion of the foamed resin to produce the outer layer. The invention can be useful, e.g., for producing foam-containing structural members having insulating properties.

BACKGROUND OF THE INVENTION

Foamed resin structures are useful in a wide variety of applications. The foamed resin is lightweight and provides good insulating properties. In some applications, it is desirable to provide the foamed resin structure with a solid resin outer layer to increase the strength of the structure. Various methods have been employed to manufacture such structures. In a typical method, a foamed resin core is first preformed and cured in a foam die. Then the foamed resin core is transported to a coating chamber where a liquid resin coating is applied and cured into a solid resin. This method is relatively time-consuming, and as a result, it may not be as economical as a simpler method. Another disadvantage is that the solid resin coating may not strongly bond to the foamed resin core.

Other methods are known for producing structures with foamed resin cores and solid resin outer layers; e.g., U.S. Pat. Nos. 3,533,901 to Sutker, 3,895,087 to Ottinger et al., 4,645,710 to Baitinger et al., 5,142,835 to Mrocca, and 5,286,320 to McGrath et al. disclose various methods for producing such structures. However, most of the known methods suffer from various drawbacks. For example, some methods require the separate formation of the core and outer layers of the structure, as in the Baitinger et al. and Mrocca patents, where a resin facing sheet or a resin-impregnated fibrous mat is adhered to the outer surface of a foamed resin core. The Ottinger et al. patent describes a molding technique where a foamed resin core is molded onto a preformed resin film.

Thus, it would be desirable to provide a method for producing a foam-containing structure which is simple and economical, and which produces a structure having a strong bond between a solid resin outer layer and a foamed resin core.

SUMMARY OF THE INVENTION

The above objects as well as other objects not specifically enumerated are achieved by a method for producing a foam-containing structure. In a first embodiment of the method, an impermeable carrier is provided including an inner surface which defines a cavity. A defoamer is applied to the inner surface of the carrier. A foamed resin is introduced into the cavity to cause a portion of the foamed resin to contact the defoamer and form a layer of liquid resin on the inner surface of the carrier. The foamed resin and liquid resin layer are cured to produce a structure including a foamed resin inner core and a solid resin outer layer. In a second embodiment of the method, a permeable carrier is provided including an inner surface which defines a cavity, and an outer surface. The outer surface of the carrier is covered with an impermeable release material. A defoamer is applied to the carrier. A foamed resin is introduced into the cavity to cause a portion of the foamed resin to contact the defoamer and form a layer of liquid resin impregnating the carrier. The impermeable release material substantially prevents the liquid resin from flowing past the outer surface of the carrier. The foamed resin and liquid resin layer are cured to produce a structure including a foamed resin inner core, the carrier as a facer material on the structure, and a layer of solid resin impregnating the carrier. In a third embodiment of the method, a permeable carrier is provided including an inner surface which defines a cavity, and an outer surface. A defoamer and a catalyst are applied to the carrier. A foamed resin is introduced into the cavity to cause a portion of the foamed resin to contact the defoamer and form a layer of liquid resin impregnating the carrier. At least a portion of the liquid resin layer contacts the catalyst and cures into a layer of solid resin which substantially prevents the liquid resin from flowing past the outer surface of the carrier. The foamed resin and any uncured portion of the liquid resin are cured to produce a structure comprising a foamed resin inner core, the carrier as a facer material on the structure, and a layer of solid resin impregnating the carrier.

Various objects and advantages of this invention will become apparent to those skilled in the art from the following detailed description of the preferred embodiment, when read in light of the accompanying drawings.

DETAILED DESCRIPTION AND PREFERRED EMBODIMENTS OF THE INVENTION

Figure 1:
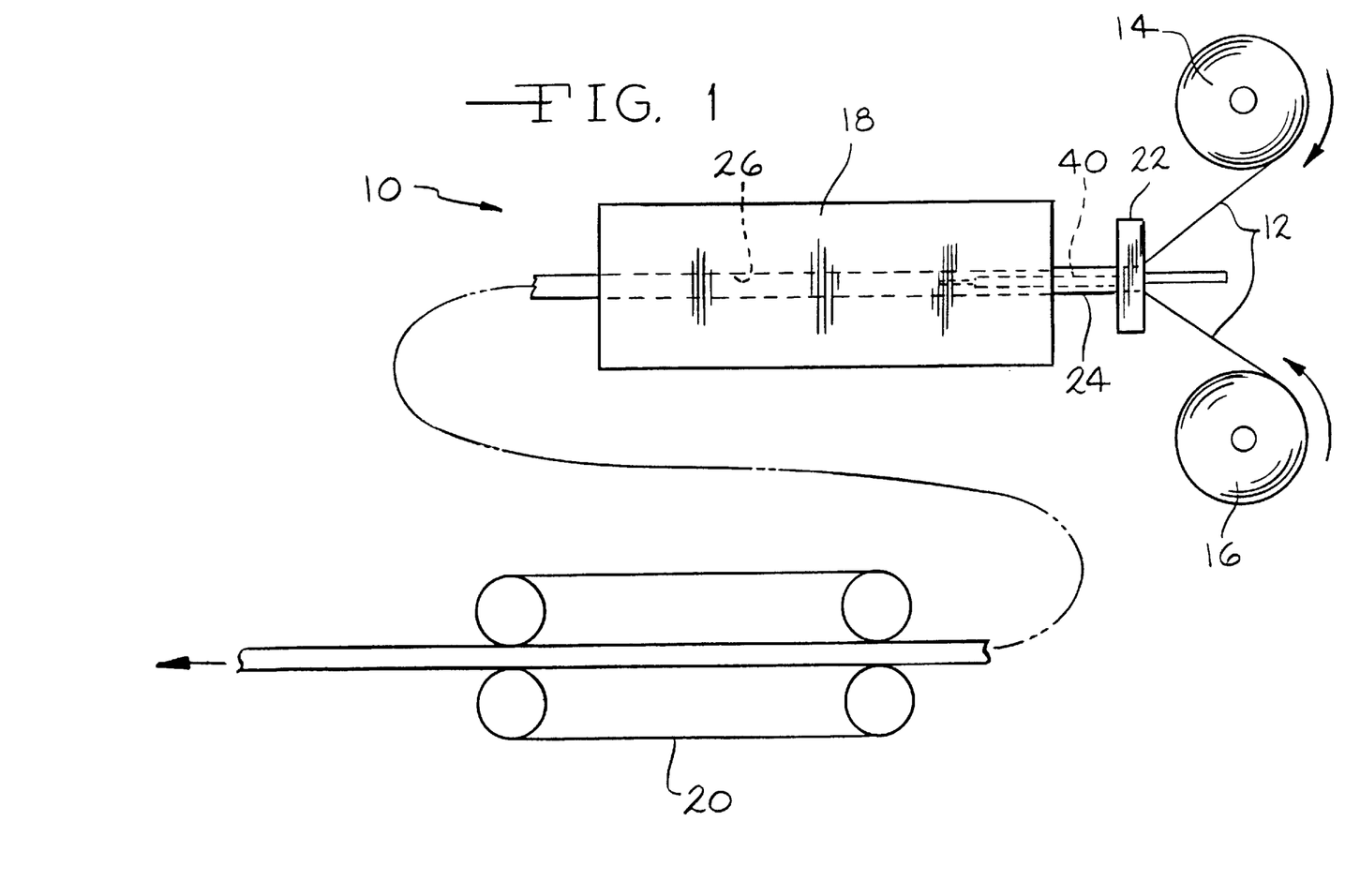
FIG. 1 is an elevational view of an apparatus for producing a foam-containing structure according to a first embodiment of the method of the invention.
Figure 2:
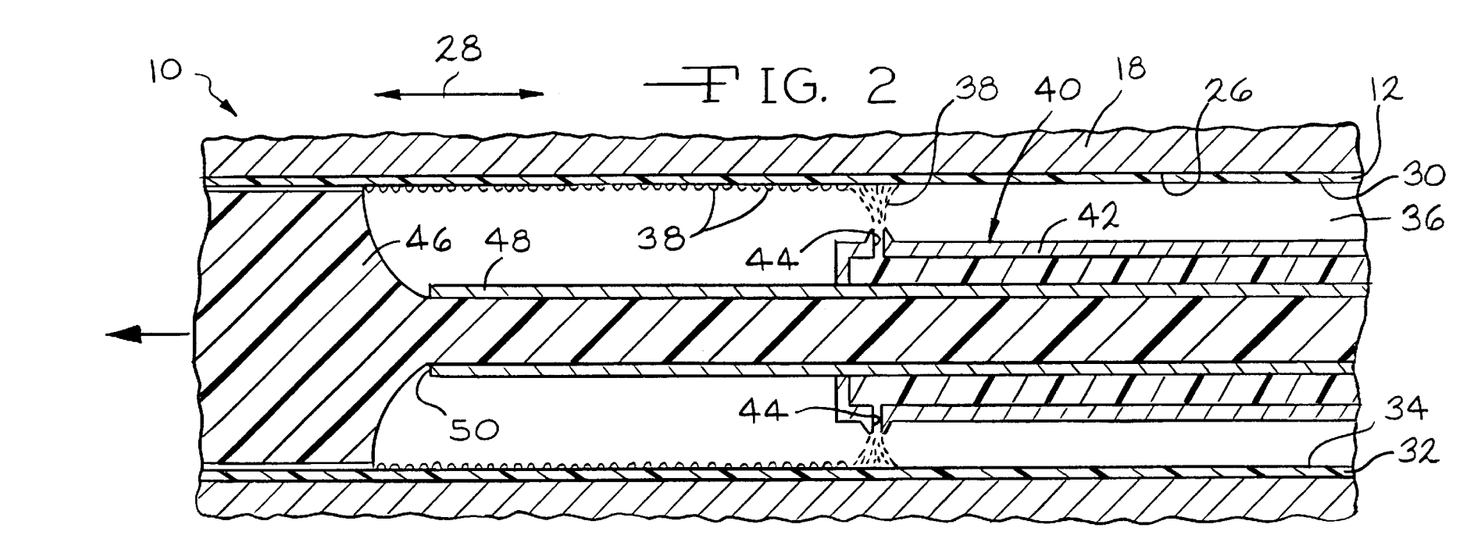
FIG. 2 is a sectional view in elevation of a portion of the apparatus of FIG. 1.

Referring now to the drawings, there is illustrated in FIGS. 1 and 2 an apparatus 10 for producing a foam-containing structure according to a first embodiment of the method of the invention. The method will be described with reference to a preferred apparatus and materials. It is to be understood, however, that the invention can also apply to other types of apparatus and materials.

The illustrated method is a continuous pultrusion method for producing the foam-containing structure. As shown in FIG. 1, two sheets of an impermeable carrier 12 are pulled from upper and lower carrier rolls 14, 16 through a pultrusion die 18 by a pulling device 20. The impermeable carrier 12 can be any material which is impermeable to a liquid resin, and which is capable of forming the desired cross-sectional shape of the foam-containing structure. For example, the carrier can be a resin film such as a polyethylene film or polyester film, a release material such as a release film or release paper, or a metallic foil. The carrier can be retained on the foam-containing structure as a facer material, or it can be removed from the structure at the completion of the method. If necessary, the inner surface of the carrier can be coated with a release agent to facilitate removal of the carrier from the foam-containing structure. When the carrier is a relatively non-rigid material such as a thin resin film, preferably the carrier is positioned inside a guide or die as shown to preserve its shape until completion of the method. A die may be unnecessary when the carrier is a thick, rigid material such as a heavy vinyl.

The sheets of carrier 12 are pulled through an opening of a former 22 which folds the sheets together into a single, hollow carrier. The carrier is then pulled around a mandrel 24 which shapes and positions the carrier for entering a die cavity 26 of the pultrusion die. The die cavity has the desired cross-sectional shape of the foam-containing structure. As best shown in FIG. 2, the carrier 12 is pulled through the die cavity 26 so that it takes the cross-sectional shape of the die cavity. In the illustrated embodiment, the die cavity is elongated in a longitudinal direction 28, so that the carrier is also elongated. The carrier includes a closed, elongated side surface. The term "side surface", as used herein, includes all the longitudinally extending sides of the carrier. In the illustrated embodiment, the side surface includes a top side 30, a bottom side 32, and left and right sides (not shown) forming a cross-section having a square shape. However, in other embodiments of the invention, the side surface can be any shape, including cylindrical. The side surface of the hollow carrier includes an inner surface 34 which defines a cavity 36.

A defoamer 38 is applied to the inner surface 34 of the carrier in any suitable manner, such as by spraying or wiping. In the illustrated embodiment, the defoamer is applied by use of an injection apparatus 40. The injection apparatus is positioned through the former 22 and the mandrel 24 and extends into the die cavity 26. As best shown in FIG. 2, the injection apparatus comprises a pair of elongated concentric tubes, which are preferably formed of metal. The outer tube having a closed end is a defoamer conduit 42 through which the defoamer is supplied. Preferably, the defoamer is supplied under pressure by pumping it from a storage tank (not shown). A plurality of defoamer discharge outlets 44 are positioned near the end of the defoamer conduit. In the illustrated embodiment, the defoamer conduit includes eight defoamer discharge outlets, two of which are shown. The defoamer discharge outlets are formed around the circumference of the defoamer conduit so that the defoamer is discharged radially outward from the defoamer conduit onto the inner surface of the carrier. Preferably, the defoamer is discharged by spraying it through the defoamer discharge outlets. As the carrier is pulled through the pultrusion die, the injection apparatus applies defoamer continuously along the length of the inner surface of the carrier. Preferably, the inner surface of the carrier is completely coated with the defoamer.

The defoamer can be any material which is capable of collapsing the foam structure of a foamed resin. Some examples of suitable defoamers include "Drewplus L-768" and "Drewplus L-418" (silicones), and "Drewplus 475" (mixture of hydrophobic silica and mineral oil), available from Drew Industrial, a division of Ashland Chemical. Another is example is "GE SF 1080" (silicone) available from General Electric. These defoamers are particularly useful for producing a defoamed layer which will release from a surface. Other examples of suitable defoamers include "Drewplus L-140" and "Drewplus Y-281" (mineral oil based, with emulsifiers). These defoamers are particularly useful for producing a defoamed layer which does not release from a surface. The amount and type of defoamer applied to the inner surface of the carrier can be adjusted to vary the thickness of the solid resin layer formed by the method, as will be described below. The defoamer is usually discharged as a particulate spray to form a thin layer of defoamer on the inner surface of the carrier. (The drawings show the defoamer 38 as particles of exaggerated size for the purpose of illustration.)

After the defoamer has been applied, a curable foamed resin 46 is introduced into cavity of the carrier by any suitable method. In the illustrated embodiment, the injection apparatus includes an inner tube which is a foam conduit 48. The foamed resin is supplied through the foam conduit from any source. Preferably, the foamed resin is supplied by feeding a foamable resin material from a storage tank (not shown). If the foamed resin is a two-component material such as a polyurethane foam, the two components can be stored in separate tanks and combined in line immediately prior to introduction. The foam conduit includes a foam discharge outlet 50 at its end for introducing the foamed resin into the cavity of the carrier. The foam conduit extends a distance past the end of the defoamer conduit.

The foamed resin can be selected from any of the suitable foamed resin materials known to persons skilled in the art. For purposes of this invention, the term "resin" includes resins, polymers, polymer precursors, inorganic ceramic precursors, and mixtures thereof. The resin can contain processing aids and agents that are known in the art for use in resins. The foamed resin can be a high density structural-type foam, or a low density insulation-type foam. Preferably, the foamed resin is selected from polyurethane foams, polyisocyanurate foams, phenolic foams, polyimide foams, epoxy foams, polyurea foams, polyolefin foams, polystyrene foams, and mixtures thereof Polyurethane foams and polyisocyanurate foams are most preferred because they rapidly cure at room temperature. Rigid polyurethane foams are well known and are commonly prepared from organic polyisocyanates and organic polyols together with known blowing agents, surfactants and catalysts. A variety of chemical and physical blowing agents can be used to expand the foam, including but not limited to water, carbon dioxide, non-fluorinated hydrocarbons, and fluorinated hydrocarbons such as HCFCs (i.e., hydrochlorofluorocarbons, e.g., dichlorofluoroethane (HCFC 141b) and chlorodifluoroethane (HCFC 142b)) and HFCs (i.e., hydrofluorocarbons, e.g., 1-fluoro-2-trifluoroethane (HFC 134a) and 1-difluoroethane (HFC 152a)). Such blowing agents are available from Allied Signal, Elf Atochem, and DuPont. Any conventional fillers and additives can be added to the foamed resin. The compositions of the foamed resins are known and the blending, mixing and formation thereof are familiar to those skilled in the art.

In the illustrated method, the defoamer and foamed resin are applied in the same continuous operation. However, in an alternate embodiment, the defoamer can be applied to the carrier in a separate operation prior to introducing the foamed resin. For example, the defoamer can be incorporated into the carrier during manufacture of the carrier.

Figure 3:
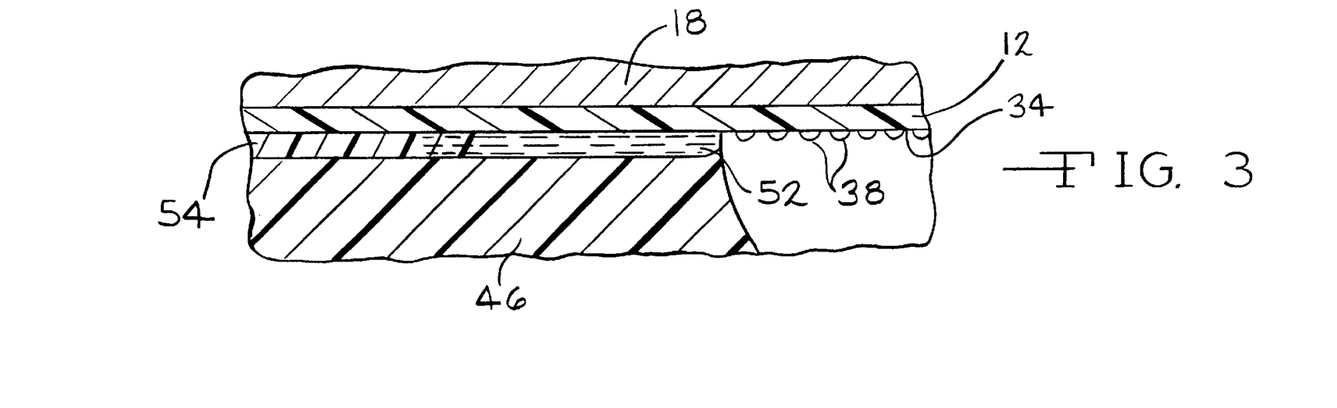
FIG. 3 is an enlarged view of a portion of FIG. 2, taken where a foamed resin contacts a defoamer on the inner surface of a carrier.

As the carrier 12 is pulled further through the pultrusion die 18, the portion of the carrier to which defoamer 38 was applied moves to a position near the foam discharge outlet 50. The foamed resin 46 is introduced into the cavity 36 and expands, and an outer portion of the foamed resin comes into contact with the defoamer on the inner surface of the carrier. Preferably, the foamed resin expands to fill the entire cavity of the carrier, so that the entire outer portion of the foamed resin contacts the defoamer. As best shown in FIG. 3, the defoamer 38 causes the outer portion of the foamed resin 46 to collapse and form a layer 52 of liquid resin on the inner surface 34 of the carrier 12. The thickness of the liquid resin layer depends, e.g., on the type and amount of defoamer applied, and on the type of foamed resin.

As the carrier is pulled further through the pultrusion die, the liquid resin layer 52 is cured into a solid resin layer 54, and the foamed resin 46 is cured into a hardened foam. If desired or necessary, electric heating coils or any other suitable means can be supplied to maintain the liquid resin and foamed resin at an elevated temperature during curing. However, preferably the liquid resin and foamed resin are cured at room temperature.

Figure 4:
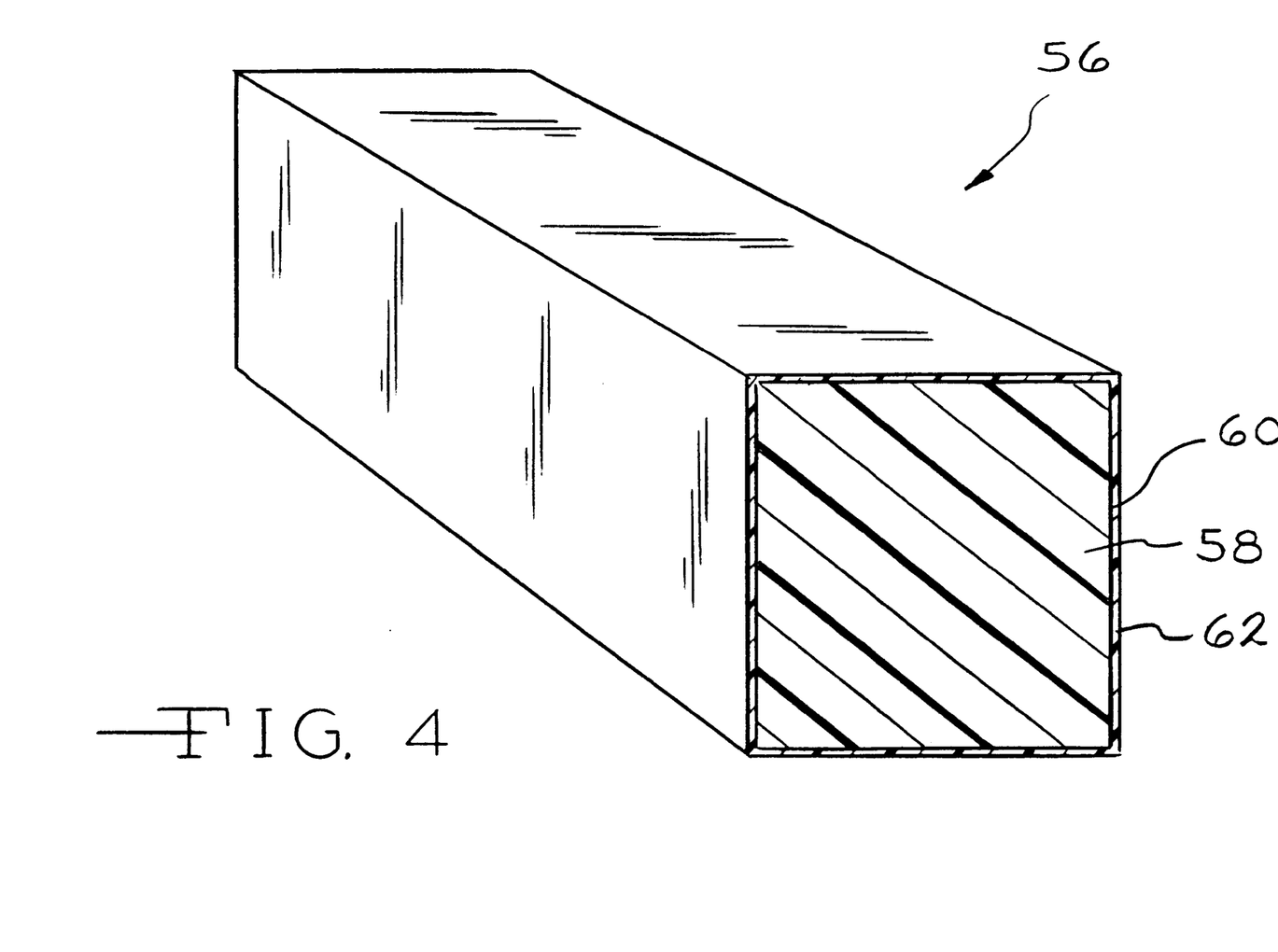
FIG. 4 is a perspective view of an elongated foam-containing structure produced by the apparatus shown in FIGS. 1 and 2.

After the resulting foam-containing structure is pulled from the pultrusion die, the carrier can be removed from the structure or retained as a facer material on the structure. The foam-containing structure can be cut by any suitable means into desired lengths. Optionally, a finish coat such as paint can be applied. FIG. 4 illustrates an elongated foam-containing structure 56 produced by the method. The structure includes a foamed resin inner core 58 including an elongated side surface 60. A solid resin outer layer 62 surrounds the side surface of the core. The core and outer layer are strongly bonded together. While the preferred embodiment includes the solid resin outer layer completely covering the foamed resin core, in another embodiment the foamed core is not completely covered.

If desired, a reinforcement layer (not shown) can be embedded in the solid resin outer layer, e.g., by pulling a permeable reinforcement sheet through the pultrusion die adjacent to the inner surface of the carrier. A portion of the liquid resin layer will flow through the permeable reinforcement sheet to the inner surface of the carrier. A variety of materials can be used as the reinforcement sheet, such as nonwoven mats, rovings, veils, or woven fabrics, composed of fibers such as glass fibers, polymer fibers, aramid fibers, carbon fibers, graphite fibers and ceramic fibers.

The method illustrated in FIGS. 1 and 2 is a preferred continuous method in which the injection apparatus is held stationary inside the pultrusion die, and the carrier is caused to move relative to the injection apparatus by pulling it through the pultrusion die. Alternatively, the carrier can be held stationary inside a die while an injection apparatus is caused to move relative to the carrier. In such a case, the method can be conducted without a separate carrier material by using the die as a carrier. In other alternate embodiments, both the carrier and injection apparatus can be stationary or moving.

Figure 5:
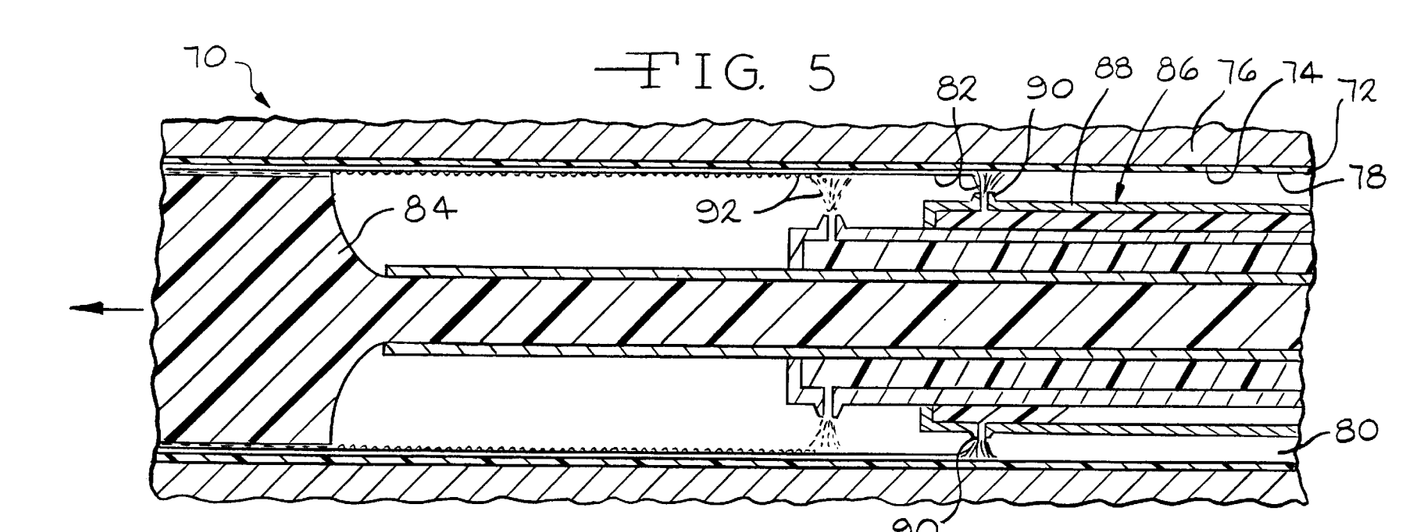
FIG. 5 is a sectional view in elevation of a portion of an apparatus for producing a foam-containing structure, the apparatus being a variation of the apparatus shown in FIG. 1.

FIG. 5 illustrates a portion of an apparatus 70 for producing a foam-containing structure according to a variation of the method illustrated in FIGS. 1–4. The variation is similar to the first embodiment shown in FIGS. 1 and 2 and described above. An impermeable carrier 72 is pulled through the die cavity 74 of a pultrusion die 76. The carrier includes an inner surface 78 which defines a cavity 80.

Figure 6:
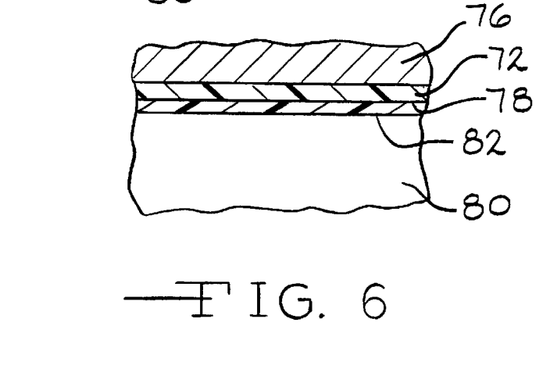
FIG. 6 is an enlarged view of a portion of FIG. 5, taken where a layer of second resin has been formed on the inner surface of a carrier.

As shown in FIGS. 5 and 6, the variation method differs from the previous method in that a layer of second resin 82 is formed on a portion of the inner surface 78 of the carrier 72 before introducing a foamed first resin 84. The layer of second resin can be formed on the inner surface of the carrier in any suitable manner. In the illustrated embodiment, the injection apparatus 86 comprises three elongated concentric tubes. The outer tube having a closed end is a liquid resin conduit 88 through which a liquid second resin 82 is supplied. Preferably, the liquid second resin is supplied under pressure by pumping it from a storage tank (not shown). A plurality of liquid resin discharge outlets 90 are positioned near the end of the liquid resin conduit. In the illustrated embodiment, the liquid resin conduit includes four liquid resin discharge outlets (two are shown), so that the liquid second resin is sprayed continuously along the four corners of the carrier as the carrier is pulled through the pultrusion die.

The liquid second resin is a curable liquid resin. The liquid second resin can be a different type of resin from the foamed first resin, or it can be the same type of resin. The liquid second resin can be selected from the group of structural thermoplastic and thermosetting resins. Suitable resins include polyurethanes, phenolics, polyesters, epoxies, vinyl esters, polyetheretheketones, polyetherimides, polyethersulphones, high density polyethylenes, polycarbonates, acrylonitrile-butadiene-styrenes (ABS), polypropylene and nylon. A preferred liquid second resin is a polyurethane resin, which may be produced by the catalyzed reaction of methylene diphenyl diisocyanate ("MDI") with glycerol. Conventional additives can be included in the liquid second resin, such as accelerating agents, compatabilizing agents, fillers, die release agents, second phases for toughening, and coloring agents.

While the illustrated method shows the second resin being applied as a liquid resin, the second resin could be applied in any form, such as a solid resin. The liquid second resin is preferably cured before introducing the foamed first resin, but the liquid second resin could also remain uncured when the foamed first resin is introduced. The liquid second resin would then be cured along with the foamed first resin. While the illustrated method shows the second resin 82 being applied continuously along the length of the carrier, the second resin could also be applied discontinuously on spaced portions of the carrier.

A defoamer 92 is also applied to the inner surface of the carrier. In the illustrated embodiment, the defoamer is applied after the second resin 82 has been applied. However, the defoamer could also be applied before the second resin is applied.

Figure 7:
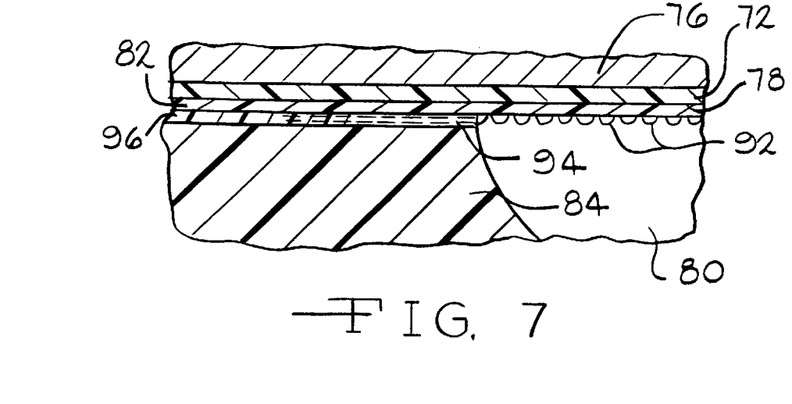
FIG. 7 is an enlarged view of a portion of FIG. 5, taken where a foamed resin contacts a defoamer applied over the second resin on the inner surface of the carrier.

After the second resin and defoamer have been applied, the foamed first resin 84 is introduced into the cavity 80 of the carrier 72. The foamed first resin expands, and an outer portion of the foamed first resin comes into contact with the defoamer 92 on the inner surface 78 of the carrier 72. As best shown in FIG. 7, the defoamer 92 causes the outer portion of the foamed first resin to collapse and form a layer of liquid first resin 94 on the inner surface of the carrier. In the illustrated embodiment, the layer of liquid first resin is laminated to the layer of liquid second resin 82 on those portions of the carrier on which the second resin has been applied. The liquid first resin layer is then cured into a solid first resin layer 96, and the foamed first resin 84 is cured into a hardened foam.

Figure 8:
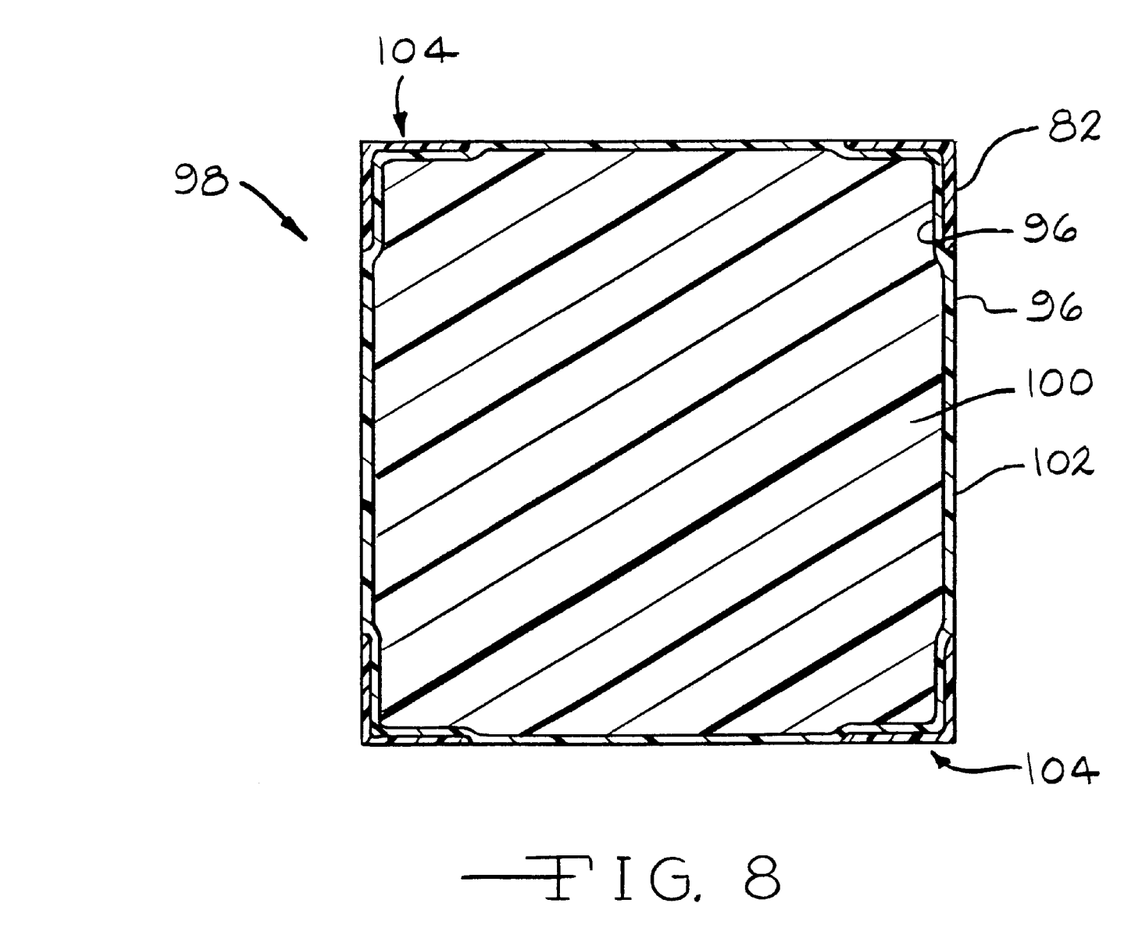
FIG. 8 is a cross-sectional view of a foam-containing structure produced by the apparatus shown in FIG. 5.

As shown in FIG. 8, the resulting foam-containing structure 98 comprises a foamed first resin inner core 100 and a solid resin outer layer 102 comprising both first resin 96 and second resin 82. In the illustrated embodiment, layers of second resin 82 were formed in the corners of the carrier before applying the defoamer over the second resin. The resulting structure includes a solid resin outer layer 102 having increased thickness portions 104 of both first resin 96 and second resin 82 in the corners of the structure. Preferably, the increased thickness portions comprise a layer of first resin laminated to a layer of second resin. In areas where the second resin was not applied, the solid resin outer layer 102 comprises first resin 96. The increased thickness portions of the solid resin outer layer can be formed to provide increased strength in areas of the structure where needed. If the defoamer was applied before the second resin, the resulting structure would include a solid resin outer layer comprising separate portions of first resin and second resin (not shown), and without increased thickness portions of both first resin and second resin.

Figure 9:
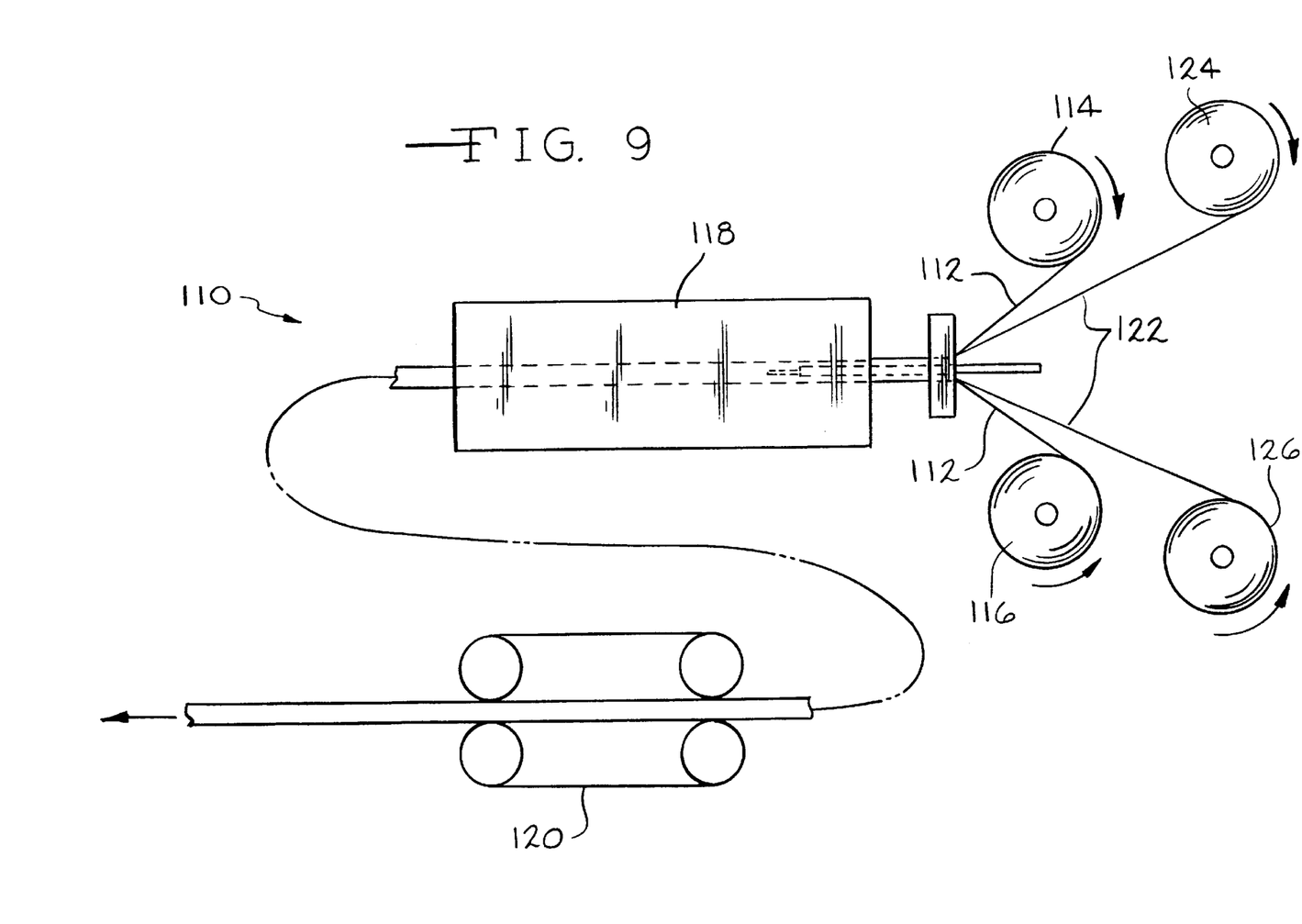
FIG. 9 is an elevational view of an apparatus for producing a foam-containing structure according to a second embodiment of the method of the invention.
Figure 10:
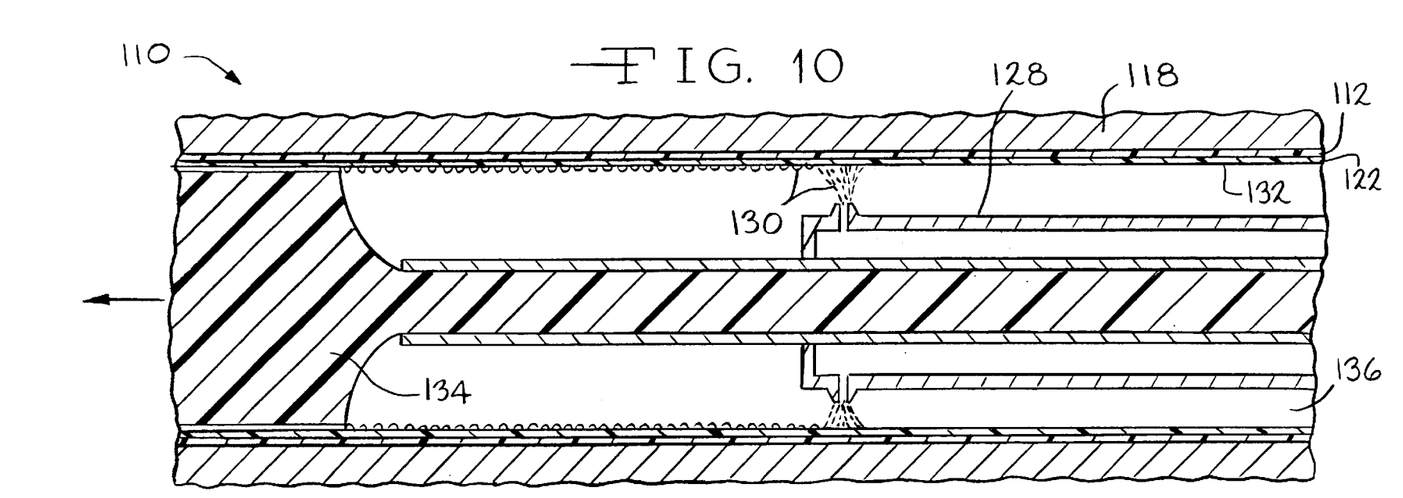
FIG. 10 is a sectional view in elevation of a portion of the apparatus of FIG. 9.

FIGS. 9 and 10 illustrate an apparatus 110 for producing a foam-containing structure according to a second embodiment of the method of the invention. Two sheets of an impermeable release material 112 are pulled from upper and lower release material rolls 114, 116 through a pultrusion die 118 by a pulling device 120. The release material can be any material which is impermeable to a liquid resin, and which can be removed from the foam-containing structure at the completion of the method. For example, the release material can be a release film or release paper. If necessary, the inner surface of the release material can be coated with a release agent to facilitate removal of the release material from the foam-containing structure.

Figure 11:
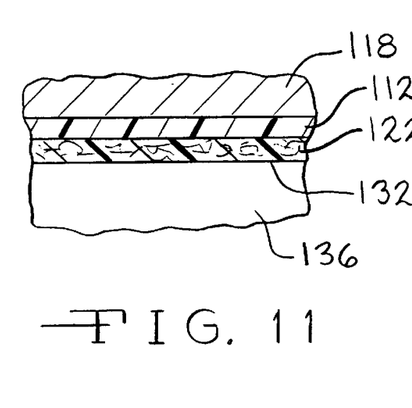
FIG. 11 is an enlarged view of a portion of FIG. 10, showing a permeable carrier and an impermeable release material on the inner surface of a die cavity.

Similarly, two sheets of a permeable carrier 122 are pulled from upper and lower carrier rolls 124, 126 through the pultrusion die. The carrier sheets are positioned inside the release material sheets to provide a structure of an inner carrier and an outer release material covering the outer surface of the carrier. FIG. 11 shows the carrier 122 positioned inside the release material 112 inside the pultrusion die 118. The permeable carrier can be any material which is permeable to a liquid resin, and which is capable of forming the desired cross-sectional shape of the foam-containing structure. For example, the permeable carrier can be selected from nonwoven mats, rovings, veils, or woven fabrics, composed of fibers such as glass fibers, polymer fibers, aramid fibers, carbon fibers, graphite fibers and ceramic fibers. A preferred permeable carrier is a glass fiber mat.

As shown in FIG. 10, an injection apparatus 128 applies a defoamer 130 to the carrier 122. The defoamer is shown applied to the inner surface 132 of the carrier, but the defoamer can also be disposed inside the permeable carrier. Optionally, the defoamer could be applied to the carrier in a separate operation prior to introducing the foamed resin, for example during manufacture of the carrier.

Figure 12:
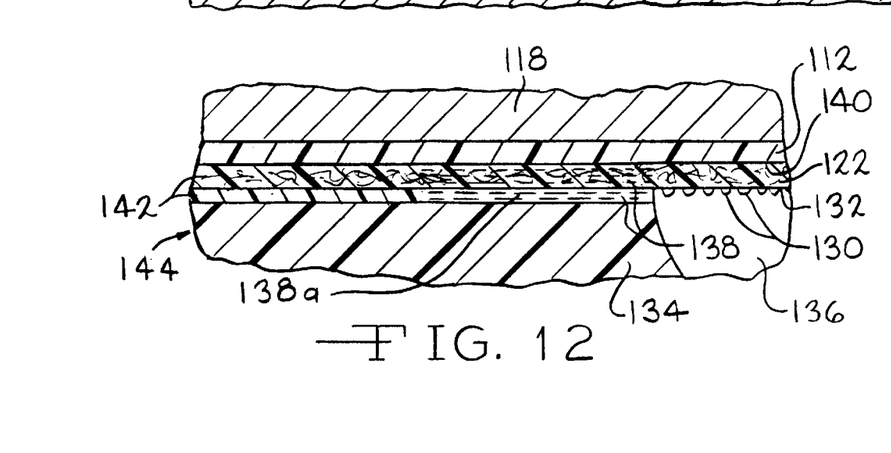
FIG. 12 is an enlarged view of a portion of FIG. 10, taken where a foamed resin contacts a defoamer applied to the permeable carrier.

After the defoamer 130 has been applied, a foamed resin 134 is introduced into the cavity 136 of the carrier. The foamed resin expands, and an outer portion of the foamed resin comes into contact with the defoamer on the carrier. As best shown in FIG. 12, the defoamer 130 causes the outer portion of the foamed resin 134 to collapse and form a layer of liquid resin 138 on the carrier 122. Because the carrier is permeable to the liquid resin, the liquid resin layer flows into the carrier and impregnates the carrier. The term "impregnates", as used herein, means that the liquid resin layer is disposed inside at least a portion of the carrier. In the illustrated embodiment, the liquid resin layer 138 extends completely through the carrier 122. However, the impermeable release material 112 substantially prevents the liquid resin from flowing past the outer surface 140 of the carrier. In the illustrated embodiment, an inner portion 138a of the liquid resin layer 138 also extends inside the inner surface 132 of the carrier.

The liquid resin layer 138 is then cured into a solid resin layer 142, and the foamed resin 134 is cured into a hardened foam. When the release material is removed, the resulting foam-containing structure 144 comprises a foamed resin inner core 134, the carrier 122 as a facer material on the structure, and a layer of solid resin 142 impregnating the carrier.

Figure 13:
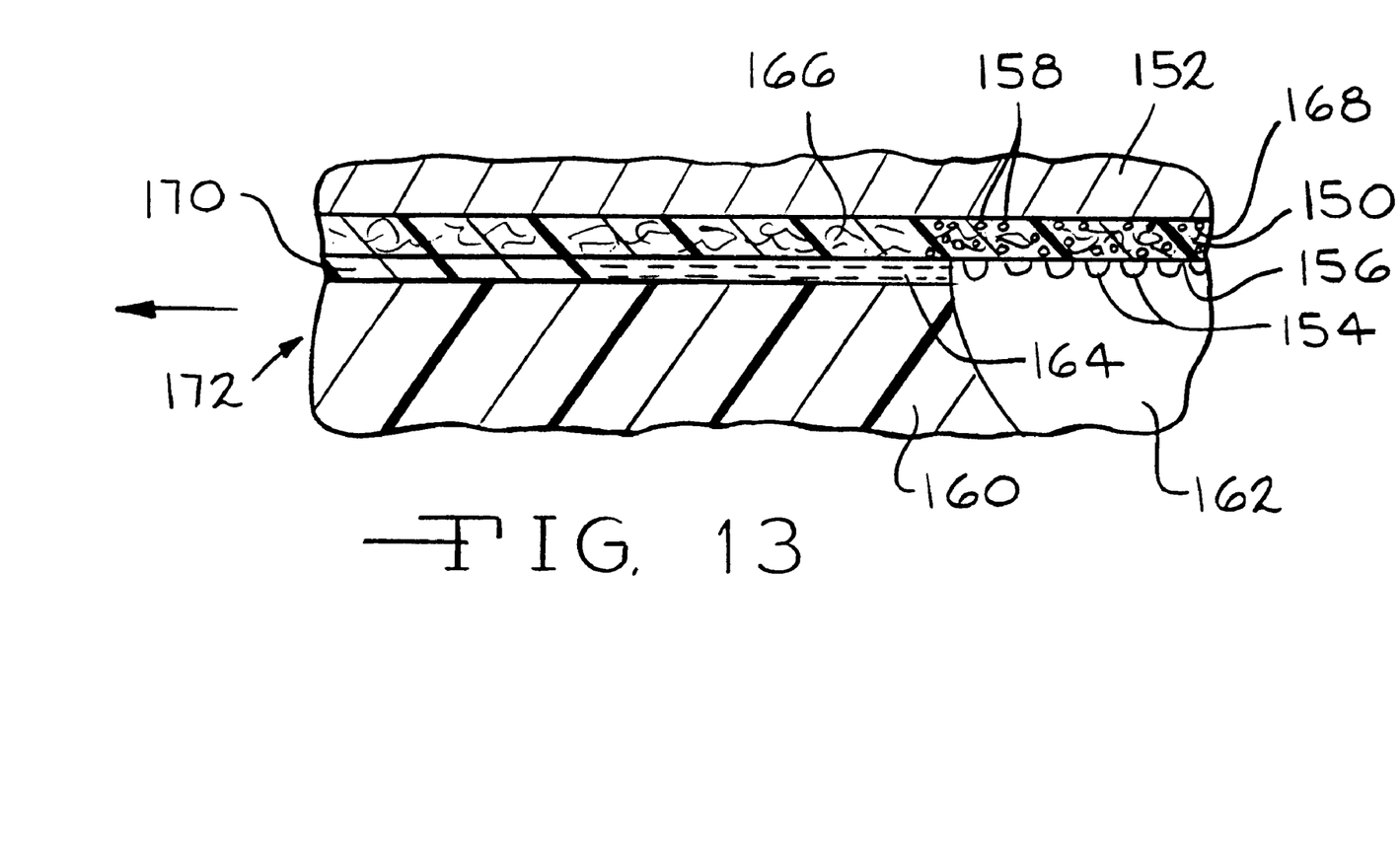
FIG. 13 is an enlarged sectional view of a portion of an apparatus for producing a foam-containing structure according to a third embodiment of the method of the invention, taken where a foamed resin contacts both a defoamer and a catalyst applied to a permeable carrier.

FIG. 13 illustrates a third embodiment of a method for producing a foam-containing structure according to the invention. A permeable carrier 150 is pulled through a pultrusion die 152. A defoamer 154 is applied to the carrier. The defoamer is shown applied to the inner surface 156 of the carrier, but the defoamer can also be disposed inside the carrier. A catalyst 158 is also applied to the carrier, either disposed inside the carrier and/or disposed on the inner surface of the carrier. The illustrated embodiment shows the catalyst previously incorporated into the carrier, for example during manufacture of the carrier. The catalyst could also be applied to the carrier by an injection apparatus. Optionally, both the defoamer and the catalyst could be applied to the carrier in a separate operation prior to introducing the foamed resin.

The catalyst can be any type of catalyst capable of causing a liquid resin to rapidly cure into a solid resin. An example of a suitable catalyst is "Dabco T-12" (dibutyl tin dilaurate) available from Air Products and Chemicals. In one embodiment of the invention, the same material functions both as a defoamer and a catalyst. An example of such a material is "Polycat 8" (dimethylcyclohexylamine) available from Air Products and Chemicals.

After the defoamer 154 and catalyst 158 have been applied, a foamed resin 160 is introduced into the cavity 162 of the carrier 150. The foamed resin expands, and an outer portion of the foamed resin comes into contact with the defoamer on the carrier. The defoamer causes the outer portion of the foamed resin to collapse and form a layer of liquid resin 164 on the carrier. Because the carrier is permeable to the liquid resin, the liquid resin layer flows into the carrier and impregnates the carrier. However, at least a portion of the liquid resin layer contacts the catalyst and rapidly cures into a layer of solid resin 166. In the illustrated embodiment, the solid resin layer 166 extends completely through the carrier 150. The formation of the solid resin layer 166 substantially prevents the liquid resin 164 from flowing past the outer surface 168 of the carrier. The liquid resin layer 164 is then cured into a solid resin layer 170, and the foamed resin is cured into a hardened foam. The resulting foam-containing structure 172 comprises a foamed resin inner core 160, the carrier 150 as a facer material on the structure, and a layer of solid resin (the combined layers 166 and 170) impregnating the carrier.

Examples of Foamed Resin Formulations

A foamed resin for use in the invention can be prepared by combining the following ingredients (in parts by weight):

| | |
|---|---|
| 65 | sucrose/amine polyol ("Voranol 360" available from Dow Chemical, having a hydroxyl number of 360) |
| 27.7 | polyol ("Alkapol XAP 440" available from Rhone Poulenc, having a hydroxyl number of 440) |
| 5.0 | amine polyol ("Alkapol 770" available from Rhone Poulenc, having a hydroxyl number of 770) |
| 0.6 | water |
| 1.0 | silicone surfactant ("Dabco DC5357" available from Air Products) |
| 0.7 | catalyst ("Dabco 33-LV" available from Air Products") |
| 100 | polymeric isocyanate ("Mondur MR" available from Miles Laboratories) |

An alternate embodiment of a foamed resin can be prepared from the following ingredients (in parts by weight):

| | |
|---|---|
| 16.5 | polyol flame retardant ("Saytex FR 1138" available from Albemarle) |
| 24.8 | amine polyol (AMG having a hydroxyl number of 370) ("Voranol 370" available from Dow Chemical) |
| 24.0 | glycerine polyol ("Terate 203" available from Cape Industries) |
| 6.8 | glycerine polyol ("Alkapol 6240" available from Rhone Poulenc, having a hydroxyl number of 240) |
| 1.2 | water |
| 1.0 | silicone surfactant ("Dabco DC5357") |
| 0.7 | dimethylcyclohexylamine (DMCHA) ("Polycat 8" available from Air Products) |
| 7.0 | trichlorofluoromethane ("CFC 11" available from Elf Atochem) |
| 82.7 | polymeric isocyanate ("Mondur MR" available from Miles Laboratories) |

In preparing the foamed resins, all the ingredients except the polymeric isocyanate are mixed together at room temperature. Then the isocyanate is mixed with the other ingredients immediately prior to introduction of the foamed resin into the carrier.

The principle and mode of operation of this invention have been described in its preferred embodiment. However, it should be noted that this invention may be practiced otherwise than as specifically illustrated and described without departing from its scope.

What is claimed is:

1. A method for producing a foam-containing structure comprising:

providing an impermeable carrier including an inner surface which defines a cavity;

applying a defoamer to the inner surface of the carrier;

introducing a foamed resin into the cavity to cause a portion of the foamed resin to contact the defoamer and form a layer of liquid resin on the inner surface of the carrier; and curing the foamed resin and liquid resin layer to produce a structure comprising a foamed resin inner core and a solid resin outer layer.

2. A method according to claim 1, in which the step of providing a carrier comprises providing a hollow elongated carrier including a closed elongated side surface, the side surface including the inner surface which defines the cavity, and in which the step of producing the structure comprises producing an elongated structure comprising a foamed resin inner core including an elongated side surface and a solid resin outer layer surrounding the side surface of the core.

3. A method according to claim 1, in which the applying of defoamer and the introducing of foamed resin comprise discharging the defoamer and foamed resin through separate outlets of an injection apparatus, and in which the carrier and injection apparatus are caused to move relative to one another during the discharging.

4. A method according to claim 3, in which the carrier is pulled through a die, and the defoamer and foamed resin are discharged inside the die.

5. A method according to claim 1, in which the carrier is retained as a facer material on the structure.

6. A method according to claim 1, in which the defoamer is applied to the carrier in a separate operation prior to introducing the foamed resin.

7. A method according to claim 1, in which the foamed resin is a first resin, and in which the method further comprises forming a layer of second resin on a portion of the inner surface before introducing the foamed first resin, to produce a structure in which the solid resin outer layer comprises both first resin and second resin.

8. A method according to claim 7, in which the layer of second resin is formed before applying the defoamer, to produce a structure in which an increased thickness portion of the solid resin outer layer comprises both first resin and second resin.

9. A method for producing a foam-containing structure comprising:

providing a permeable carrier including an inner surface which defines a cavity, and an outer surface;

covering the outer surface of the carrier with an impermeable release material;

applying a defoamer to the carrier;

introducing a foamed resin into the cavity to cause a portion of the foamed resin to contact the defoamer and form a layer of liquid resin impregnating the carrier, the impermeable release material substantially preventing the liquid resin from flowing past the outer surface of the carrier; and curing the foamed resin and liquid resin layer to produce a structure comprising a foamed resin inner core, the carrier as a facer material on the structure, and a layer of solid resin impregnating the carrier.

10. A method according to claim 9, in which the step of providing a carrier comprises providing a hollow elongated carrier including a closed elongated side surface, the side surface including the inner surface which defines the cavity, and in which the step of producing the structure comprises producing an elongated structure comprising a foamed resin inner core including an elongated side surface, the carrier as a facer material surrounding the side surface of the core, and the layer of solid resin impregnating the carrier and surrounding the side surface of the core.

11. A method according to claim 9, in which the applying of defoamer and the introducing of foamed resin comprise discharging the defoamer and foamed resin through separate outlets of an injection apparatus, and in which the carrier and injection apparatus are caused to move relative to one another during the discharging.

12. A method according to claim 11, in which the carrier is pulled through a die, and the defoamer and foamed resin are discharged inside the die.

13. A method according to claim 9, in which the defoamer is applied to the carrier in a separate operation prior to introducing the foamed resin.

14. A method according to claim 9, in which the foamed resin is a first resin, and in which the method further comprises forming a layer of second resin on a portion of the inner surface before introducing the foamed first resin, to produce a structure in which the solid resin layer comprises both first resin and second resin.

15. A method according to claim 14, in which the layer of second resin is formed before applying the defoamer, to produce a structure in which an increased thickness portion of the solid resin outer layer comprises both first resin and second resin.

16. A method for producing a foam-containing structure comprising:

providing a permeable carrier including an inner surface which defines a cavity, and an outer surface;

applying a defoamer and a catalyst to the carrier;

introducing a foamed resin into the cavity to cause a portion of the foamed resin to contact the defoamer and form a layer of liquid resin impregnating the carrier, at least a portion of the liquid resin layer contacting the catalyst and curing into a layer of solid resin which substantially prevents the liquid resin from flowing past the outer surface of the carrier; and curing the foamed resin and any uncured portion of the liquid resin layer to produce a structure comprising a foamed resin inner core, the carrier as a facer material on the structure, and a layer of solid resin impregnating the carrier.

17. A method according to claim 16, in which the step of providing a carrier comprises providing a hollow elongated carrier including a closed elongated side surface, the side surface including the inner surface which defines the cavity, and in which the step of producing the structure comprises producing an elongated structure comprising a foamed resin inner core including an elongated side surface, the carrier as a facer material surrounding the side surface of the core, and the layer of solid resin impregnating the carrier and surrounding the side surface of the core.

18. A method according to claim 16, in which the applying of defoamer and catalyst and the introducing of foamed resin comprise discharging the defoamer, catalyst and foamed resin through separate outlets of an injection apparatus, and in which the carrier and injection apparatus are caused to move relative to one another during the discharging.

19. A method according to claim 16, in which the defoamer and catalyst are applied to the carrier in a separate operation prior to introducing the foamed resin.

20. A method according to claim 16, in which the step of applying the defoamer and catalyst comprises applying a material which functions both as a defoamer and a catalyst.

\* \* \* \* \*